(12) United States Patent
Park

(10) Patent No.: US 11,068,816 B2
(45) Date of Patent: Jul. 20, 2021

(54) SYSTEM AND METHOD FOR SELECTING RESEARCH AND DEVELOPMENT PROJECT THROUGH AUTONOMOUS PROPOSALS OF EVALUATION INDICATORS

(71) Applicant: Sangho Park, Daejeon (KR)

(72) Inventor: Sangho Park, Daejeon (KR)

(*) Notice: Subject to any disclaimer, the term of this patent is extended or adjusted under 35 U.S.C. 154(b) by 444 days.

(21) Appl. No.: 15/772,807

(22) PCT Filed: Dec. 30, 2016

(86) PCT No.: PCT/KR2016/015594
§ 371 (c)(1),
(2) Date: May 1, 2018

(87) PCT Pub. No.: WO2017/116215
PCT Pub. Date: Jul. 6, 2017

(65) Prior Publication Data
US 2018/0330296 A1 Nov. 15, 2018

(30) Foreign Application Priority Data
Dec. 31, 2015 (KR) .................. 10-2015-0190617

(51) Int. Cl.
*G06Q 10/06* (2012.01)
*G06Q 30/08* (2012.01)
*G06F 16/00* (2019.01)

(52) U.S. Cl.
CPC ....... *G06Q 10/06313* (2013.01); *G06F 16/00* (2019.01); *G06Q 10/06* (2013.01); *G06Q 30/08* (2013.01)

(58) Field of Classification Search
CPC ............ G06Q 10/00–50/00; G06F 1/00–40/00
(Continued)

(56) References Cited

U.S. PATENT DOCUMENTS 6,466,919 B1 * 10/2002 Walker .................. G06Q 10/02
705/26.2
6,513,019 B2 * 1/2003 Lewis .................... G06Q 30/04
705/35

(Continued)

FOREIGN PATENT DOCUMENTS

KR 10-2004-0094050 A 11/2004
KR 10-2005-0117976 A 12/2005
(Continued)

*Primary Examiner* — Alan S Miller
(74) *Attorney, Agent, or Firm* — Maschoff Brennan

(57) ABSTRACT

The present invention relates to a system and a method for selecting a research and development project through autonomous proposals of evaluation indicators, in which performance information generated according to a selection of performance evaluation items for research and development project bidding is classified by bidders, and the research and development project is selected for each classified bidder group. The present invention allows research and development project bidders to select evaluation indicators which serve as criteria for selecting a research and development project, thereby being capable of guaranteeing autonomy and providing fair bidding opportunities to all research and development project bidders. Also, since a research and development project is selected for each group classified according to the autonomously selected performance evaluation items, transparent selection and fair competition between the research and development project bidders can be ensured, and research and development projects can be equally divided.

59 Claims, 8 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,647,374 | B2 * | 11/2003 | Kansal | G06Q 10/0639 705/37 |
| 7,130,802 | B1 * | 10/2006 | Mehregany | G06Q 10/06 705/7.14 |
| 7,461,013 | B2 * | 12/2008 | Moeller | G06Q 30/02 705/26.4 |
| 7,853,472 | B2 * | 12/2010 | Al-Abdulqader | G06Q 30/0641 705/7.13 |
| 7,877,293 | B2 * | 1/2011 | Biebesheimer | G06Q 30/0601 705/26.64 |
| 2001/0034632 | A1 * | 10/2001 | Wilkinson | G06Q 10/06 705/7.15 |
| 2001/0051913 | A1 * | 12/2001 | Vashistha | G06Q 40/04 705/37 |
| 2002/0091623 | A1 * | 7/2002 | Daniels | G06Q 40/04 705/37 |
| 2002/0178077 | A1 * | 11/2002 | Katz | G06Q 10/10 705/7.36 |
| 2002/0188547 | A1 * | 12/2002 | Banerjee | G06Q 30/08 705/37 |
| 2003/0028473 | A1 * | 2/2003 | Eso | G06Q 30/08 705/37 |
| 2003/0200168 | A1 * | 10/2003 | Cullen | G06Q 30/08 705/37 |
| 2004/0181457 | A1 * | 9/2004 | Biebesheimer | G06Q 30/0641 705/14.49 |
| 2004/0236547 | A1 * | 11/2004 | Rappaport | H04W 16/20 703/2 |
| 2005/0114829 | A1 * | 5/2005 | Robin | G06Q 10/06 717/101 |
| 2006/0064369 | A1 * | 3/2006 | Moeller | G06Q 30/0611 705/37 |
| 2006/0069635 | A1 * | 3/2006 | Ram | G06Q 30/08 705/37 |
| 2006/0106774 | A1 * | 5/2006 | Cohen | G06Q 30/06 |
| 2007/0016514 | A1 * | 1/2007 | Al-Abdulqader | G06Q 10/06 705/37 |
| 2007/0124231 | A1 * | 5/2007 | Ristock | G06Q 30/08 705/37 |
| 2007/0250901 | A1 * | 10/2007 | McIntire | H04N 21/8586 725/146 |
| 2010/0023810 | A1 * | 1/2010 | Stolfo | G06F 11/0751 714/38.11 |
| 2010/0312373 | A1 * | 12/2010 | Bertheau | G06Q 10/06 700/103 |
| 2011/0295722 | A1 * | 12/2011 | Reisman | G06Q 30/0641 705/27.1 |
| 2011/0307347 | A1 * | 12/2011 | Jentsch | G06Q 30/06 705/26.4 |
| 2013/0110566 | A1 * | 5/2013 | Sousa Sobral | G06Q 10/00 705/7.12 |
| 2014/0006201 | A1 * | 1/2014 | Judd | G06Q 30/08 705/26.3 |
| 2016/0027051 | A1 * | 1/2016 | Gross | G06K 9/46 705/14.54 |
| 2016/0048911 | A1 * | 2/2016 | Carpenter | G06Q 30/08 705/7.19 |
| 2018/0330296 | A1 * | 11/2018 | Park | G06Q 10/06 |

FOREIGN PATENT DOCUMENTS

| | | |
|---|---|---|
| KR | 10-2006-0004484 A | 1/2006 |
| KR | 10-2011-0043280 A | 4/2011 |
| KR | 10-2012-0040589 A | 4/2012 |
| KR | 10-2012-0121933 A | 11/2012 |
| KR | 10-2011-0052189 A | 5/2015 |
| KR | 10-2015-0061485 A | 6/2015 |

* cited by examiner

[FIG.1]
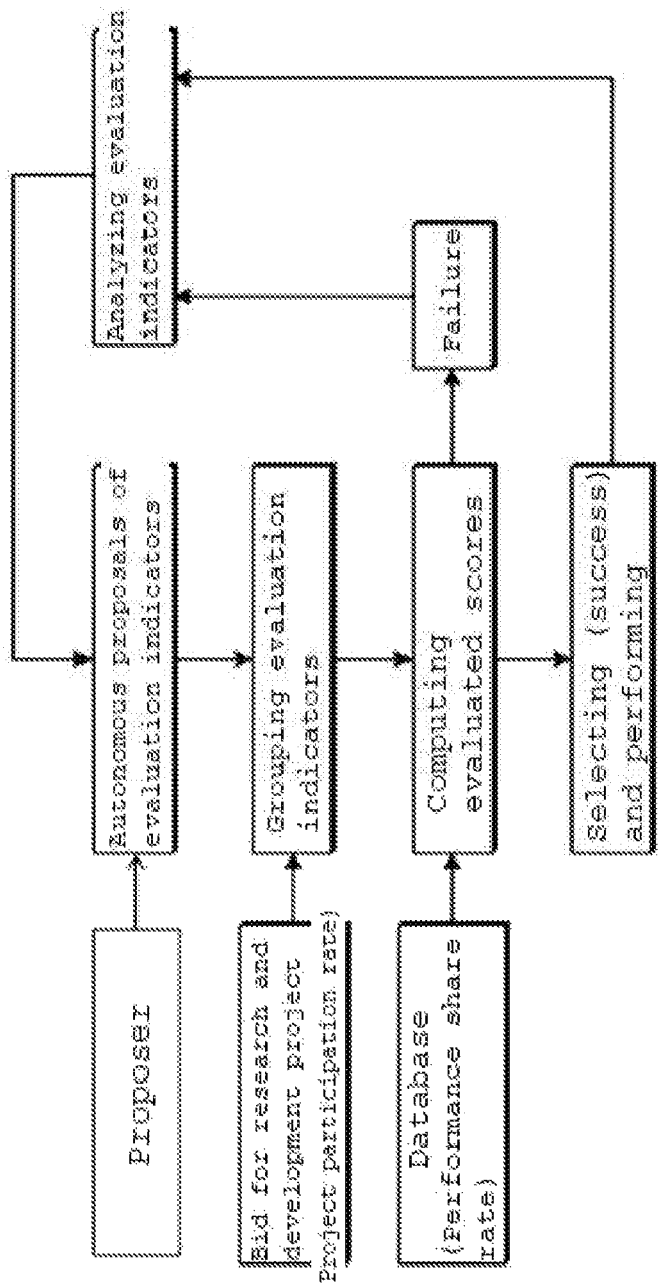

[FIG.2]
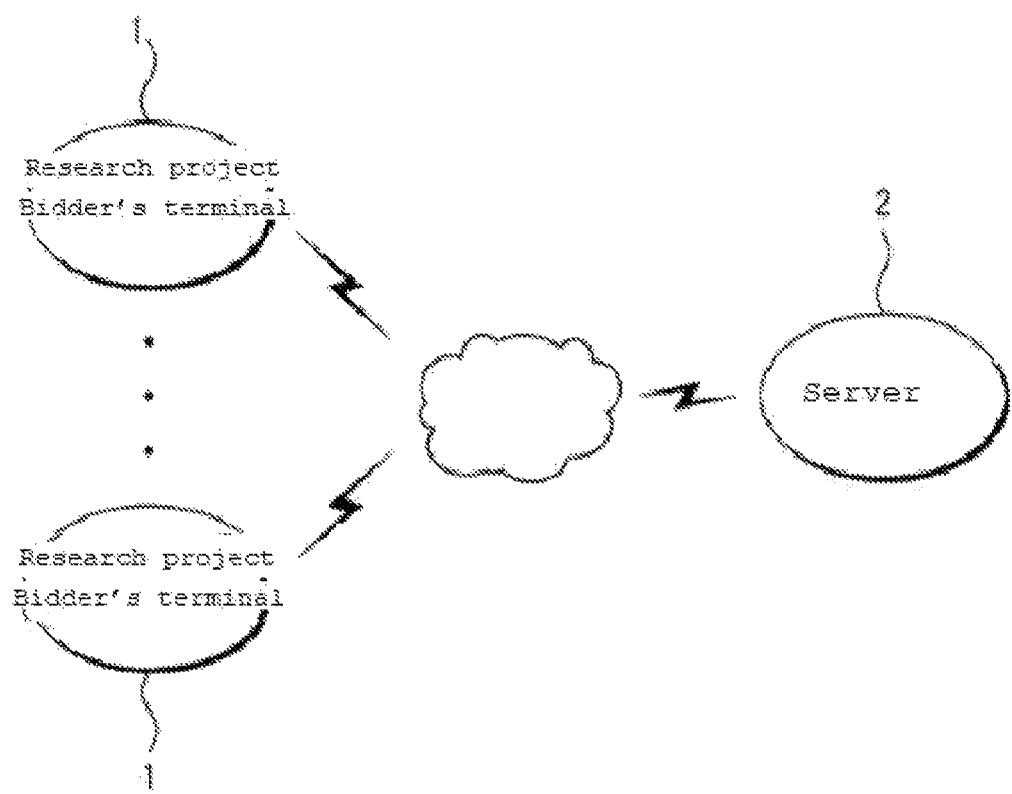

[FIG.3]
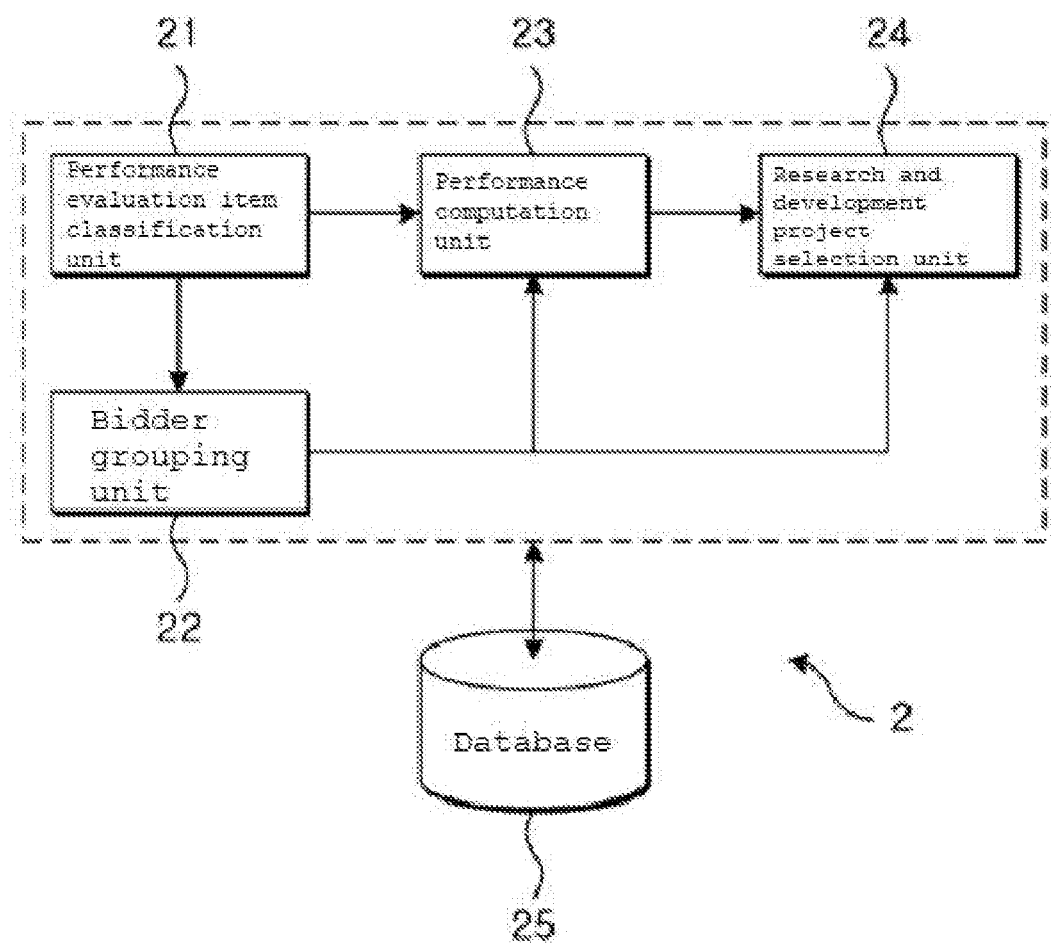

[FIG.4]
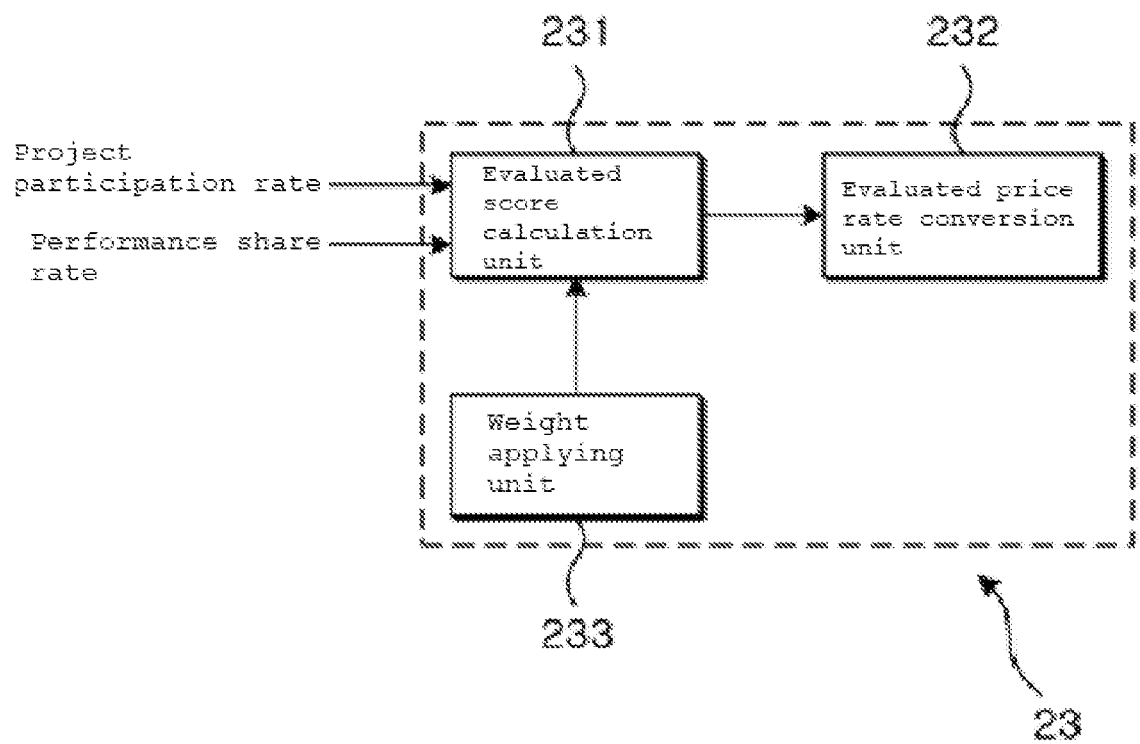

[FIG.5]
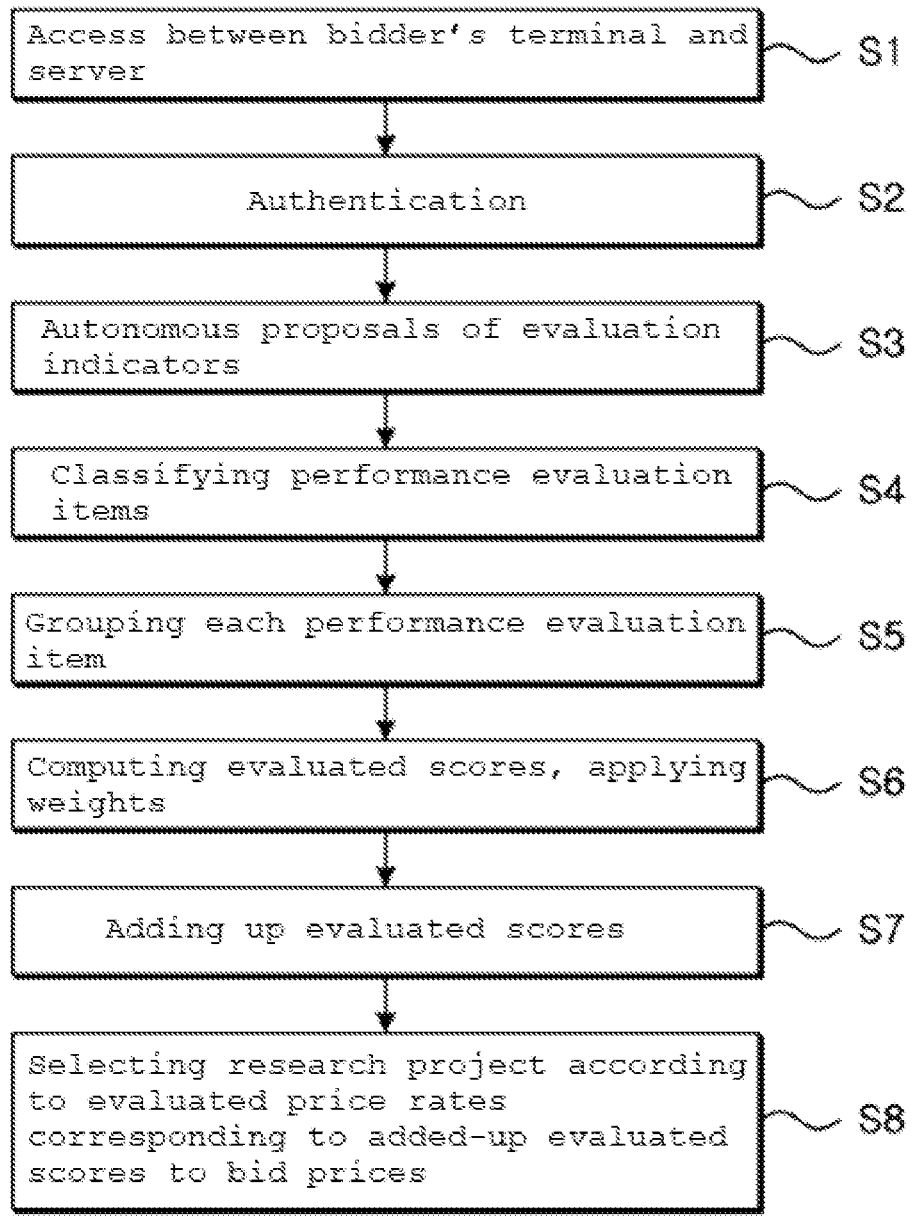

[FIG.6]

| Evaluation indicator | Paper | Patent | Employment | ... |
|---|---|---|---|---|
| Professor A | 100 |  | 40 |  |
| Professor B | 50 | 50 | 100 |  |
| Professor C |  | 100 | 100 |  |
| Professor D | 50 | 100 |  |  |
| ... |  |  |  |  |

Performance evaluation item

Weight

[FIG.7]

Performance evaluation item

Paper P (Weight: 100 Points)

Author A : 10%    Evaluated score of author A: 100 Points X 10%=10 Points

Author B : 90%    Evaluated score of author B: 100 Points X 90 %=90 Points

Performance evaluation item

Employment Q (Weight: 40 Points)

Individual : 100%    Evaluated score of author B: 40 Points X 100 %=40 Points

[FIG.8]
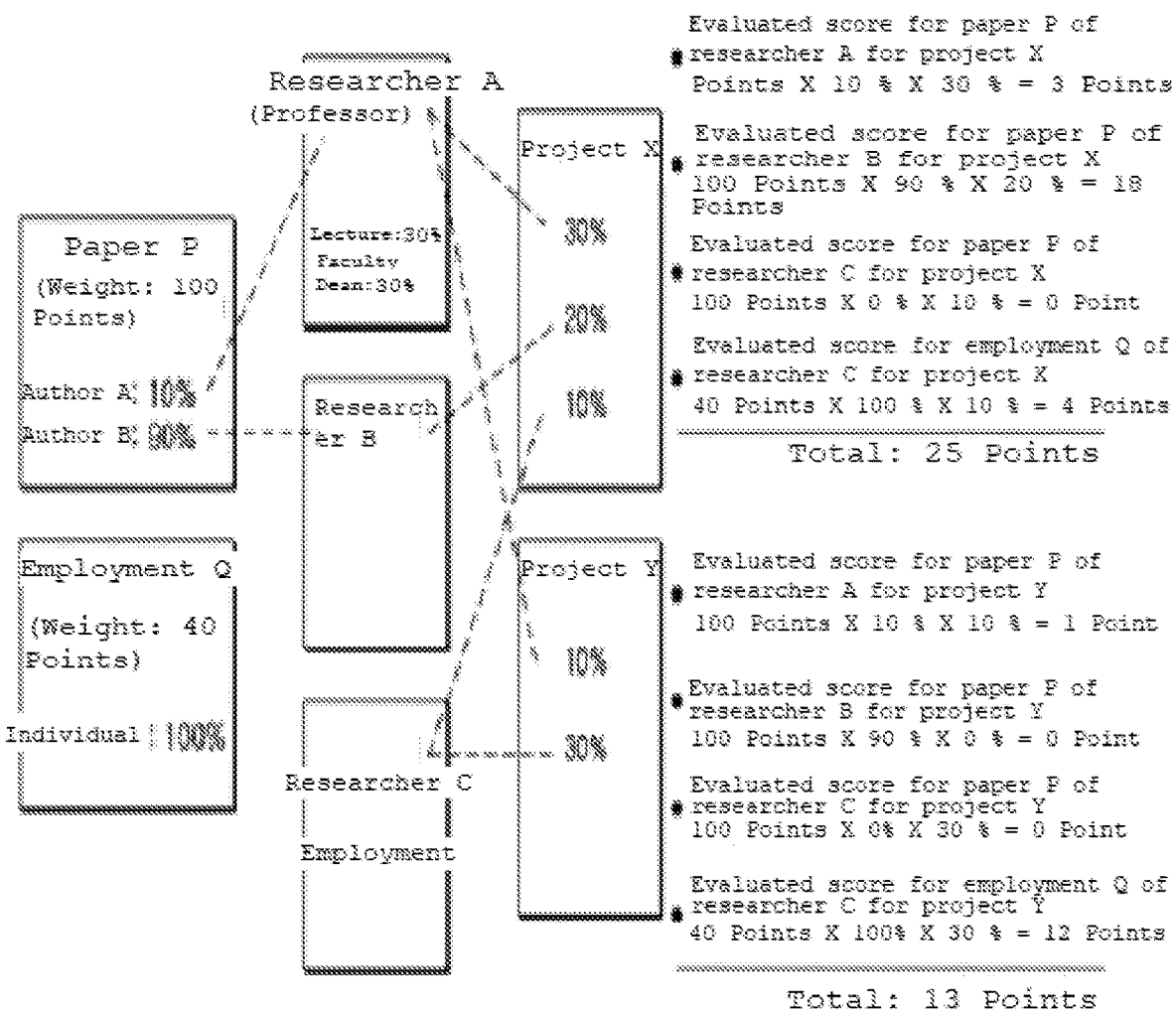

SYSTEM AND METHOD FOR SELECTING RESEARCH AND DEVELOPMENT PROJECT THROUGH AUTONOMOUS PROPOSALS OF EVALUATION INDICATORS

TECHNICAL FIELD

The present invention relates to a method for selecting a research and development project and more particularly, to a system and a method for selecting a research and development project through autonomous proposals of evaluation indicators, capable of selecting a research and development project by using evaluation indicators autonomously proposed by research and development project bidders.

RELATED ART

Conventional methods for selecting a research and development project are heavily dependent on the subjective and qualitative evaluation of experts on technology, and screening methodology focusing on technical features and potential growth is used to select a research and development project. That is, conventional objective indicators for technology evaluation performed by technology evaluation institutes are used to select promising research and development projects.

However, in such methods, indicators for technology evaluation are only used individually, and mutual relationships between indicators are not analyzed and evaluated in an integrative way. That is, conventional methods for selecting a research and development project are used only for assisting decision making in deriving promising research and development projects.

Further, in conventional methods for selecting a research and development project, research and development project bidders have opportunities to bid for a project only in the case that they satisfy the requirements of all the given performance evaluation items for the project. As a result, research and development projects are not distributed proportionately. This is because performance evaluation items are limited only to specific ones. In general, those performance evaluation items include quantitative indicators such as the number of papers. In this case, a school which submitted no paper is unlikely to be selected for a project. In addition, using one paper to bid for different projects is also a problem.

Accordingly, in terms of the method of selecting a research and development project, new methods for selecting a research and development project are necessary not only for enhancing autonomy and fairness but also for ensuring equal distribution.

PRIOR ART DOCUMENT

Patent Document

Korean Laid-Open Patent Publication No. 10-2011-0052189 (Publication Date 2011.05.18)

DESCRIPTION OF THE INVENTION

Technical Problems

As a means to solve the above-described problems with the related arts, the present invention aims to provide a system and a method for selecting a research and development project through autonomous proposals of evaluation indicators, capable of proposing evaluation indicators autonomously selected by research and development project bidders as criteria for selecting a research and development project, and ensuring transparent selection and fair competition between the research and development project bidders in the relevant group classified according to evaluation indications.

Technical Solutions

A system for selecting a research and development project through autonomous proposals of evaluation indicators according to an embodiment of the present invention includes a bidder's terminal for proposing performance evaluation items, which serve as criteria for selecting a research and development project, as evaluation indicators and for generating performance information on the evaluation indicators, and a server for storing the evaluation indicators and the performance information thereon uploaded by the bidder's terminal and for selecting a bidder who will carry out the research and development project by carrying out performance evaluation computation.

In an example, the server groups a plurality of the evaluation indicators proposed by the bidder's terminal to generate evaluation indicator groups.

The bidder's terminal proposes at least one of papers, patents, employment, details on execution of research expenses and the total amount thereof, technology transfer as the performance evaluation items.

The bidder's terminal accesses the server through the Internet, and accesses the server through web browsers or exclusive applications.

In an example, the server includes a performance evaluation item classification unit for classifying at least one performance evaluation item the evaluation indicators include into evaluation indicator groups; a bidder grouping unit for allowing bidders to be included in the classified performance indicator groups so as to group the bidders; a performance computation unit for computing performance according to the performance evaluation items on the basis of each group; and a research and development project selection unit for selecting a research and development project according to preset regulations on the basis of each group.

The bidder's terminal is construed as a plurality of bidders' terminals, and the evaluation indicators proposed by the plurality of bidders' terminals are uploaded to the server.

The server stores the evaluation indicators, generated and delivered by the bidder's terminal, in a database, and the database is updated each time new evaluation indicators are proposed on the bidder's terminal.

The performance evaluation item classification unit updates the evaluation indicators by analyzing the evaluation indicators.

In addition, the performance evaluation item classification unit analyzes evaluation indicator groups which are different from each other to integrate the evaluation indicator groups which are different from each other into one evaluation indicator group, and resets weights of the integrated evaluation indicator group.

The performance evaluation item classification unit analyzes evaluation indicator groups which are different from each other to integrate the evaluation indicator groups which are different from each other into one evaluation indicator group, and resets evaluation periods of the integrated evaluation indicator group.

The performance evaluation item classification unit analyzes an evaluation indicator group to divide the evaluation indicator group into two different evaluation indicator groups.

The server allows the performance information on the evaluation indicators generated by the bidder's terminal to correspond with a plurality of evaluation indicator groups so as to carry out performance evaluation computation, and provides to the bidder's terminal computation results of specific evaluation indicator groups with the best performance evaluation computation results.

The performance computation unit includes an evaluated score calculation unit for calculating evaluated scores of a participant researcher put into a project; and an evaluated price rate conversion unit for adding up evaluated scores of participant researchers put into the project and for converting the added-up evaluated scores to bid costs into evaluated price rates.

In this case, the evaluated score calculation unit calculates the evaluated scores of each participant researcher by using project participation rates of the participant researchers put into the project.

In addition, in this case, the evaluated score calculation unit calculates the evaluated scores of each participant researcher through multiple operations of the project participation rates and performance share rates in the performance evaluation items of the participant researchers put into the project.

The bidder's terminal proposes weights of the evaluation indicators proposed by the bidder's terminal and also, uploads the weights of the evaluation indicators to the server.

The bidder's terminal proposes evaluation periods of the evaluation indicators proposed by the bidder's terminal and also, uploads the evaluation periods of the evaluation indicators to the server.

The research and development project selection unit calculates the computation results of the performance computation unit as evaluated scores, and compares the calculated evaluated scores respectively with bid prices of ordinary years and with bid prices of the bidder's terminal to calculate, according to the calculated evaluated scores, probability of success in a bid of the bidder's terminal and to inform the bidder's terminal of the probability.

The research and development project selection unit calculates the computation results of the performance computation unit as evaluated scores, and compares the calculated evaluated scores respectively with bid prices of ordinary years and with bid prices of the bidder's terminal to calculate, according to the calculated evaluated scores, bid prices available for success in a bid of the bidder's terminal and to inform the bidder's terminal of the bid prices.

The research and development project selection unit calculates the computation results of the performance computation unit with respect to a plurality of evaluation indicator groups as evaluated scores, and compares the plurality of calculated evaluated scores respectively with bid prices of ordinary years and with bid prices of the bidder's terminal to calculate, according to the plurality of calculated evaluated scores, probability of success in a bid of the bidder's terminal and to inform the bidder's terminal of the probability.

The performance computation unit calculates the computation results of the performance computation unit with respect to a plurality of evaluation indicator groups as evaluated scores, and informs the bidder's terminal of the evaluation indicators in which the highest evaluated scores are calculated.

The performance share rates are given with the consent of the participant researchers and stored in the server.

The total performance share rate in one piece of performance information is less than or equal to 100%, and when a bid for a research and development project is successful, the performance share rates are fixed and stored in the server.

The project participation rates are managed according to each participant researcher on the basis of any one of the units of year, month, week, day, and stored in the server.

The performance computation unit informs the bidder's terminal of ratios of the optimum project participation rates of which the highest evaluated scores are calculated according to changes in ratios of each project participation rate of the participant researcher with respect to various projects.

The performance computation unit informs the bidder's terminal of ratios of a plurality of project participation rates, of which identical evaluated scores are calculated, of the participant researcher with respect to various projects.

The total project participation rate of one participant researcher is less than or equal to 100%, and when a bid for a research and development project is successful, the project participation rates of the relevant project are fixed and stored in the server.

The research and development selecting unit calculates evaluated scores of each participant researcher put into a project, adds up the evaluated scores of the researchers put into the project, converts the added-up evaluated scores to bid costs into evaluated price rates, and on the basis of the evaluated price rates, selects a research and development project.

When a bidder who will carry out the research and development project is selected, the server pays commissions to the bidder's terminal proposing the evaluation indicators used for selecting the bid and the commissions are paid in a certain amount of the total research expenses of the research and development project.

The server pays the commissions as a copyright royalty to the bidder's terminal proposing the used evaluation indicators, when the evaluation indicators proposed by the bidder's terminal are used.

The server stores feedback on the used evaluation indicators, and the bidder's terminal updates evaluation indicators on the basis of the feedback.

A method for selecting a research and development project through autonomous proposals of evaluation indicators according to an embodiment of the present invention includes a step in which a bidder's terminal autonomously proposes evaluation indicators as performance evaluation items to transmit the evaluation indicators to a server or selects evaluation indicators stored in a server; and a step in which the server classifies the evaluation indicators selected by each bidder's terminal, groups bidders selecting identical or similar evaluation indicators, and selects a research and development project by computing performance according to the performance evaluation items on the basis of each group.

In an example, the performance evaluation items in the evaluation indicators preferably includes any one of papers, patens, employment, details on execution of research expenses and the total amount thereof, technology transfer.

While the bidder's terminal accesses the server through the Internet, the bidder's terminal accesses the server through web browsers or exclusive applications.

The method for selecting a research and development project through autonomous proposals of evaluation indicators further includes a step in which a plurality of bidders' terminals access the server through access accounts before the step in which a bidder's terminal autonomously proposes evaluation indicators as performance evaluation items to transmit the evaluation indicators to a server or selects evaluation indicators stored in a server.

The step, in which the server classifies the evaluation indicators selected by each bidder's terminal, groups bidders selecting identical or similar evaluation indicators, and selects a research and development project on the basis of each grouping includes calculating evaluated scores of each participant researcher put into a project; adding evaluated scores of participant researchers put into the relevant project to the calculated evaluated scores; converting the added-up evaluated scores to bid costs into evaluated price rates to select a research and development project on the basis of the converted evaluated price rates according to ranks or selection rates, by the server.

In this case, the step, in which the server calculates evaluated scores of each participant researcher put into a project, includes calculating evaluated scores of each participant researcher on the basis of project participation rates of participant researchers put into a project.

In addition, in this case, the step in which the server computes evaluated scores of each participant researcher put into a project includes computing evaluated scores of each participant researcher through multiple operations of project participation rates of participant researchers put into a project and performance share rates in the performance evaluation items.

The bidder's terminal groups a plurality of evaluation indicators to transmit the grouped evaluation indicators to the server or selects the grouped evaluation indicators stored in the server, in the step in which a bidder's terminal autonomously proposes evaluation indicators as performance evaluation items to transmit the evaluation indicators to a server or selects evaluation indicators stored in a server.

The bidder grouping unit allows the bidder's terminal to be included in the grouped evaluation indicators in the step in which the server classifies the evaluation indicators selected by each bidder's terminal, groups bidders selecting identical or similar evaluation indicators, and selects a research and development project by computing performance according to the performance evaluation items on the basis of each group.

The method for selecting a research and development project through autonomous proposals of evaluation indicators further includes a step in which when the bidder's terminal transmits grouped evaluation indicators to the server, the server updates a database storing the grouped evaluation indicators after the step in which the server classifies the evaluation indicators selected by each bidder's terminal, groups bidders selecting identical or similar evaluation indicators, and selects a research and development project by computing performance according to the performance evaluation items on the basis of each group.

The step, in which the server classifies the evaluation indicators selected by each bidder's terminal, groups bidders selecting identical or similar evaluation indicators, and selects a research and development project by computing performance according to the performance evaluation items on the basis of each group, includes analyzing evaluation indicators that are different from each other by the server.

The step, in which the server classifies the evaluation indicators selected by each bidder's terminal, groups bidders selecting identical or similar evaluation indicators, and selects a research and development project by computing performance according to the performance evaluation items on the basis of each group, includes analyzing evaluation indicators that are different from each other to integrate the evaluation indicators that are different from each other into one evaluation indicator, and resetting weights of the integrated evaluation indicator group, by the server.

The step, in which the server classifies the evaluation indicators selected by each bidder's terminal, groups bidders selecting identical or similar evaluation indicators, and selects a research and development project by computing performance according to the performance evaluation items on the basis of each group, includes analyzing evaluation indicators that are different from each other to integrate the evaluation indicators that are different from each other into one evaluation indicator, and resetting evaluation periods of the integrated evaluation indicator group, by the server.

The server analyzes evaluation indicators that are different from each other to divide one evaluation indicator into evaluation indicators that are different from each other, in the step in which the server classifies the evaluation indicators selected by each bidder's terminal, groups bidders selecting identical or similar evaluation indicators, and selects a research and development project by computing performance according to the performance evaluation items on the basis of each group.

The step of converting the added-up evaluated scores to bid costs into evaluated price rates to select a research and development project on the basis of the converted evaluated price rates according to ranks or selection rates includes allowing performance information on the evaluation indicators generated by the bidder's terminal to correspond with a plurality of evaluation indicator groups to carry out performance evaluation computation, and providing to the bidder's terminal computation results of specific evaluation indicator groups with the best performance evaluation computation results, by the server.

The bidder's terminal proposes weights of the evaluation indicators proposed by the bidder's terminal and also, uploads the weights of the evaluation indicators to the server.

The bidder's terminal proposes evaluation periods of the evaluation indicators proposed by the bidder's terminal and also, uploads the evaluation periods of the evaluation indicators to the server.

The server calculates performance computation results as evaluated scores, and compares the calculated evaluated scores respectively with bid prices of ordinary years and with bid prices of the bidder's terminal to calculate, according to the calculated evaluated scores, probability of success in a bid of the bidder's terminal and to inform the bidder's terminal of the probability in selecting a research and development project by computing performance according to the performance evaluation items on the basis of each group.

The server calculates performance computation results as evaluated scores, and compares the calculated evaluated scores respectively with bid prices of ordinary years and with bid prices of the bidder's terminal to calculate, according to the calculated evaluated scores, bid prices available for success in a bid of the bidder's terminal and to inform the bidder's terminal of the bid prices in selecting a research and development project by computing performance according to the performance evaluation items on the basis of each group.

The server calculates performance computation results with respect to a plurality of evaluation indicator groups as evaluated scores, and compares the plurality of calculated evaluated scores respectively with bid prices of ordinary years and with bid prices of the bidder's terminal to calculate, according to the plurality of evaluated scores, bid prices available for success in a bid of the bidder's terminal and to inform the bidder's terminal of the bid prices in selecting a research and development project by computing performance according to the performance evaluation items on the basis of each group.

The server adds up evaluated scores of researchers to calculate the total score, and preferably informs the bidder's terminal of the optimum evaluation indicator groups according to evaluated scores, average and current bid prices, and evaluation indicator groups.

The performance share rates are given with the consent of participant researchers and stored in the server.

The total performance share rates in one piece of performance information is less than or equal to 100%, and when a bid for a research and development project is successful, the performance share rates are fixed and stored in the server.

The project participation rates are managed according to each participant researcher on the basis of any one of the units of year, month, week, day, and are stored in the server.

The server calculates evaluated scores by putting together the project participation rates regarding all the projects the participant researcher participated in with respect to the project participation rates of the participant researcher.

The method for selecting a research and development project through autonomous proposals of evaluation indicators further includes a step in which the server transmits to the bidder's terminal ratios of the project participation rates of which the highest evaluated scores are computed according to changes in the project participation rates of the participant researcher.

In this case, preferably, the method for selecting a research and development project through autonomous proposals of evaluation indicators further includes a step in which the server transmits to the bidder's terminal ratios of a plurality of project participation rates, in which identical evaluated scores are calculated, of the participant researcher.

The total project participation rate of one participant researcher is less than or equal to 100%, and when a bid for the research and development project is successful, the project participation rates are preferably fixed and stored in the server.

The step of selecting a research and development project includes calculating evaluated scores of a researcher put into a project, adding up evaluated scores of researchers put into the project, converting the added-up evaluated scores to bid costs into evaluated price rates, and selecting a research and development project on the basis of the evaluated price rates.

The method for selecting a research and development project through autonomous proposals of evaluation indicators further includes a step in which the server transmits to the bidder's terminal information on the commissions for a certain ratio of the total research expenses of the selected research and development project.

The method for selecting a research and development project through autonomous proposals of evaluation indicators further includes a step in which the server transmits to the bidder's terminal information on the commission for a copyright in the evaluation indicators used in the selected research and development project and pays copyright royalties to a proposer of the evaluation indicators.

The method for selecting a research and development project through autonomous proposals of evaluation indicators further includes a step in which the server stores feedback on evaluation indicators, and the bidder's terminal updates the evaluation indicators on the basis of the feedback.

Advantageous Effects

As described above, a system and a method for selecting a research and development project through autonomous proposals of evaluation indicators according to the present invention allows research and development project bidders to select criteria for selecting a research and development project, thereby being capable of guaranteeing autonomy and providing fair bidding opportunities to all research and development project bidders.

Further, according to the present invention, because a research and development project is selected on the basis of each group which are classified according to the autonomously selected evaluation indicators, transparent selection and fair competition between the research and development project bidders can be ensured, and research and development projects can be equally divided.

BRIEF DESCRIPTION OF THE DRAWINGS

FIG. 1 illustrates a recursive algorithm for autonomous proposals of evaluation indicators suggested in the present invention.

FIG. 2 is a diagram of a system for selecting a research and development project through autonomous proposals of evaluation indicators according to an embodiment of the present invention.

FIG. 3 is a diagram of a server according to an embodiment of the present invention.

FIG. 4 is a diagram of a performance computation unit according to an embodiment of the present invention.

FIG. 5 is a flow chart of a method for selecting a research and development project through autonomous proposals of evaluation indicators according to an embodiment of the present invention.

FIG. 6 is a table illustrating an example of performance evaluation items and weights as an embodiment of the present invention.

FIG. 7 is a view illustrating an example of how to calculate evaluated scores as an embodiment of the present invention.

FIG. 8 is a view illustrating an example of how to calculate evaluated scores for each project as an embodiment of the present invention.

MODE FOR CARRYING OUT THE INVENTION

Hereunder, a system and a method for selecting a research and development project through autonomous proposals of evaluation indicators according to the present invention will be described in detail, by referring to the attached drawings.

Like reference numerals denote elements for performing identical functions throughout the attached drawings.

FIG. 1 illustrates a recursive algorithm for autonomous proposals of evaluation indicators suggested in the present invention.

By referring to FIG. 1, the present invention has a recursive structure in which grouping is performed according to each evaluation indicator when a proposer autonomously propose evaluation indicators, evaluated scores for a project are calculated on the basis of each group to determine whether to select the project, feedback on the evaluation indicators on the basis of each group is input according to the results of determining whether to select the project, the proposer uses the feedback data to analyze and update the evaluation indicators for autonomous proposals.

The proposer autonomously proposing evaluation indicators may be a research project bidder's terminal 1 (hereinafter referred to as "bidder's terminal") which will be described hereunder by referring to FIG. 2, but the proposer may not be the bidder's terminal 1 but another terminal that may only propose evaluation indicators to deliver the valuation indicators to a server 2 but not group the evaluation indicators.

Herein, the project in the present invention means a research and development project which is proposed and bid for.

Further, the evaluation indicators in the present invention include performance evaluation items, and weights and evaluation periods for quantitatively expressing the performance evaluation items.

In this case, the performance evaluation items as criteria for selecting a research and development project may include requirements for regulations preset by existing specific institutes, or items directly set (selected) by bidders.

In an example, the performance evaluation items include paper publication, patent application, students' employment, the total amount of research expenses and details on execution of research expenses, technology transfer etc.

In addition, in this case, the weights are numerical values given to the performance evaluation items, and the evaluation periods available for acknowledging the performance evaluation items are respectively set for each performance evaluation item.

FIG. 2 is a diagram of a system for selecting a research and development project through autonomous proposals of evaluation indicators according to an embodiment of the present invention.

By referring to FIG. 2, a system for selecting a research and development project through autonomous proposals of evaluation indicators according to the present invention includes a research and development project bidder's terminal (hereinafter referred to as "bidder's terminal") for generating performance information according to a selection of the performance evaluation items included in the evaluation indicators, and a server 2 for storing and managing the performance information and for selecting a research and development project on the basis of each bidder group classified according to the performance information.

The bidder's terminal 1 as a terminal possessed by a bidder may be a computer or a mobile terminal, and may be a terminal which remotely accesses the server 2 through the Internet.

In an example, the bidder's terminal 1 may access the server 2 through web browsers or exclusive programs, and may access the server 2 through an access account corresponding to one bidder.

The server 2 may store information delivered from the bidder's terminal 1, may store results of performing a process according to a request delivered from the bidder's terminal 1, or may provide the results to the bidder's terminal 1.

A system for selecting a research and development project through autonomous proposals of evaluation indicators, configured as described above, generates performance information according to each of the performance evaluation items included in the evaluation indicators according to the evaluation indicators selected by the bidder on the bidder's terminal 1 to deliver the performance information to the server 2 when the bidder's terminal 1 accesses the server 2, and then, the server 2 stores the performance information and selects a research and development project according to the performance information. In this case, groups are classified according to the performance evaluation items selected by each bidder, and a research and development project is selected according to the ratio set on the basis of each of the groups.

In this case, the bidder's terminal 1 may access the server 2 to select the evaluation indicators already having been stored in the server 2. However, in another example, the bidder's terminal 1 may upload and store evaluation indicators proposed by the bidder, who uses the bidder's terminal 1, in the server 2, or may group the relevant evaluation indicators to upload and store the grouped evaluation indicators in the server 2.

Meanwhile, the embodiment illustrates the bidder's terminal 1 generating performance information, but the server 2 may generate performance information in the state where the bidder's terminal 1 accesses the server 2 in real time.

FIG. 3 is a diagram of a server according to an embodiment of the present invention.

By referring to FIG. 3, a server 2 according to the present invention includes a performance evaluation item classification unit 21 for classifying selected or newly input performance evaluation items into performance indicator groups, a bidder grouping unit 22 for allowing bidders to be included in the classified performance indicator groups to group the bidders, a performance computation unit 23 for computing performance according to performance evaluation items on the basis of each group, and a research and development project selection unit 24 for selecting a research and development project according to preset regulations for each group.

In an example, when the performance evaluation item classification unit 21 classifies selected or newly input performance evaluation items into performance indicator groups, the performance evaluation item classification unit 21 may generate a new evaluation indicator group by merging two different evaluation indicator groups already having been classified into performance indicator groups, or by dividing one evaluation indicator group into two different evaluation indicator groups.

In this case, the performance indicator groups include performance evaluation items, and weights and evaluation periods, and when the performance evaluation item classification unit 21 merges different performance indicator groups, if there are repeated performance evaluation items in two different evaluation indicator groups which are objects for merging, a weight set in each of the relevant evaluation indicator groups is newly given to the performance evaluation items.

In addition, the bidder grouping unit 21 allows bidders to be included in preset evaluation indicator groups, and by doing so, a plurality of bidders belonging to the evaluation indicator groups are grouped. The server 2 may include a performance evaluation item classification unit 21, a bidder grouping unit 22, a performance computation unit 23, and a database 25 for storing processed data and input and output data of a research and development project selection unit 24.

The database 25 may store performance evaluation items in evaluation indicators and weights and evaluation periods thereof, performance share rates of performance information relevant to performance evaluation items, project participation rates of participant researchers.

The performance share rates indicate performance shares for one performance evaluation item. In an example, in the case that there is a paper as a performance evaluation item, and paper A is registered as performance in the item of a paper, author A and author B may have 10%, 90% of performance share rates respectively and the total performance share rate is 100%.

In addition, the project participation rates indicate the degree, in which professors or students (hereinafter referred to as "participant researcher"), having performance shares etc. in performance evaluation items, participated in the projects that will be bid, with respect to various performance evaluation items as share rates. In the case that author A of paper A participates in project A and project B, the project participation rates of author A is divided and given to project A and project B respectively.

In this case, the database 25 stores evaluation indicators proposed and provided by the bidder's terminal 1 and stores evaluation indicators proposed, grouped and provided by the bidder's terminal 1.

In addition, in this case, the database 25 provides the stored evaluation indicators or grouped evaluation indicators to the bidder's terminal 1 according to the request of the bidder's terminal 1.

In addition, in the case that another bidder's terminal 1 selects and uses the grouped evaluation indicators proposed by one bidder's terminal 1 and uploaded to the server 2, profits are distributed as copyright royalties to the relevant bidder's terminal 1, or an access account of the relevant bidder's terminal 1 suggesting the grouped evaluation indicators and uploading the grouped evaluation indicators to the sever 2.

Herein, when the grouped evaluation indicators are selected and used by another bidder's terminal 1, the server 2 distributes the profits to the bidder's terminal 1 or the access account thereof suggesting the grouped evaluation indicators and the server 2 adds to the database 25 the information that the grouped evaluation indicators stored in the database 25 are selected by another bidder's terminal 1 or the access account thereof.

In an example, in order that the profits are distributed when the grouped evaluation indicators are selected, the database 25 may store a means to receive the profits, e.g. an account number, input by the bidder's terminal 1 or the access account thereof, according to the bidder's terminal 1 or the information on the access account thereof.

In another example, part of research and development expenses may be distributed as commissions to the server 2 when the evaluation indicator groups consisting of an evaluation indicator or evaluation indicators proposed by the bidder's terminal 1 are used for selecting a research and development project.

As described above, the database 25 stores the evaluation indicators or the grouped evaluation indicators and is renewed when new evaluation indicators or grouped evaluation indicators are input. Because the selection of the grouped evaluation indicators is stored as information when the grouped evaluation indicators are selected and used, the bidder's terminal 1 extracts and uses the evaluation indicators or the grouped evaluation indicators from the server 2 such that the bidder efficiently uses the grouped evaluation indicators appropriate for selecting a research and development project.

In this case, when the evaluation indicator groups are selected and then, the server 2 distributes the profits to the bidder's terminal 1 or the access account thereof proposing the relevant evaluation indicator groups, the server 2 may store the date when and the frequency in which the evaluation indicator groups are selected as additional information to the database 25.

In addition, in the case that the evaluation indicator groups are given scores by the bidder's terminal 1, the server 2 may store the given scores in the database 25 to apply the given scores to profit distributions.

In an example, the bidder's terminal 1 generating evaluation indicator groups may check scores given to the relevant evaluation indicator groups generated by the bidder's terminal 1 by accessing the server, or that scores are given to the relevant evaluation indicator groups may be checked on the bidder's terminal in real time. As a result, the bidder may check the scores given to the evaluation indicator groups generated by the bidder and change the performance evaluation items or weights of the evaluation indicator groups to improve the evaluation indicator groups.

In addition, out of the information stored in the database 25, the performance share rates are preferably given with the consent of the participant researchers, the total performance share rate in the performance information relevant one performance evaluation item is less than or equal to 100%.

Further, preferably, the project participation rates are managed for each participant researcher by selecting any one of the units of year, month, week, day, and the total project participation rate of one participant researcher is less than or equal to 100%. Preferably, the project participation rates are fixed when a bid for a research and development project is successful.

In an example of project participation rates managed according to a schedule, in the case that a participant researcher is a professor and the relevant professor served as a faculty dean last month and used 50% out of the project participation rate of 100% to serve as a faculty dean, the relevant professor has the project participation rate of less than or equal to 50% left to be given to a project that will be bid for. However, in the case the professor has not served as a faculty dean from this month, the relevant professor may distribute the project participation rate of 100% to the performance evaluation item.

A bidder grouping unit 22 may allow bidders to be included in the preset relevant evaluation indicator groups according to the performance evaluation items, and may generate new evaluation indicator groups according to new performance evaluation items. In this case, preferably, the evaluation indicators are updated through analysis of the new evaluation indicators. Further, the bidder grouping unit 22 may analyze evaluation indicators that are different from each other to integrate the evaluation indicators that are different from each other into one evaluation indicator, or to divide one evaluation indicator into tow ore more evaluation indicators. In addition, the bidder grouping unit 22 may transmit performance evaluation items available for success in a bid to the bidder's terminal.

The performance computation unit 23 calculates the total score by adding up the evaluated scores, and may transmit to the bidder' terminal probability of success in a bid or bid prices available for success in a bid according to the evaluated scores and average and current bid prices, and the optimum performance evaluation groups.

The server 2, configured as described above, allows bidders to be included in the evaluation indicator groups generated by the bidder's terminal 1 to group the bidders included in the evaluation indicator groups, or when bidders input the performance information and select the performance evaluation items relevant to the performance information, the server 2 groups the bidders by automatically selecting the most advantageous evaluation indicator groups or the preset evaluation indicator groups the bidders want according to the performance evaluation items extracted from the performance information, and selects a research and development project according to the evaluated scores to the bid costs by computing performance according to the performance evaluation items on the basis of each group.

FIG. 4 is a diagram of a performance computation unit according to an embodiment of the present invention.

By referring to FIG. 4, a performance computation unit 23 according to the present invention includes an evaluated score calculation unit 231 for calculating evaluated scores of each participant researcher through multiple operations of the project participation rates and the performance share rates in the performance evaluation items of a participant researcher put into a project, and an evaluated price rate conversion unit 232 for adding up the evaluated scores of participant researchers put into the project and converting the added-up evaluated scores to bid prices into evaluated price rates.

The performance computation unit 23 according to the present invention may further include a weight applying unit 233 for applying weights to quantitatively express each performance evaluation item set by the bidder in the case that performance evaluation items are more than or equal to two. The weight applying unit 233 as described above is applied in the case that performance evaluation items are more than or equal to two and the weight applying unit 233 is selectively applied to the configuration of the performance computation unit 23. The weight applying unit 233 applies weights for quantitatively expressing evaluated scores calculated by the evaluated score calculation unit 231.

The performance computation unit 23, configured as described above, according to the present invention, calculates evaluated scores of each participant researcher through multiple operations of the project participation rates and the performance share rates in the performance evaluation items of a participant researcher put into a project. In this case, weights are applied to quantitatively express each performance evaluation item set by the bidder such that evaluated scores are computed. Then, evaluated scores of participant researchers put into the project are added up and the added-up evaluated scores to bid costs are converted into evaluated price rates. On the basis of the evaluated price rate, a research and development project is selected.

Meanwhile, the server 2 may suggest the optimum evaluation indicator groups available to bid for a research and development project by analyzing the optimum evaluation indicator groups with respect to performance evaluation items input by bidders. In an example, the server calculates the total score by adding up evaluated scores of participant researchers, and may make known probability of success in a bid or bid prices available for success in a bid according to the evaluated scores and average and current bid prices. Further, the server calculates the total score by adding up evaluated scores of participant researchers and may make known the optimum evaluation indicator groups according to the evaluated scores and average and current bid prices and evaluation indicator groups.

In this case, when the server 2 selects the optimum evaluation indicator groups from performance evaluation items input by bidders, the server 2 automatically selects evaluation indicator groups by using information already having been uploaded from the bidder's terminal 1 to the server 2 and having been stored in the database 25—i.e. information on performance evaluation items, performance share rates, project participation rates, and in the relevant process, the bidder's terminal 1 is not requested to perform a separate job.

Then, a method for selecting a research and development project through autonomous proposals of evaluation indicators according to the present invention using the system configured as described above will be described.

FIG. 5 is a flow chart of a method for selecting a research and development project through autonomous proposals of evaluation indicators according to an embodiment of the present invention.

By referring to FIG. 5, when a bidder's terminal 1 accesses a server 2 (S1), a bidder obtains authentication by logging in etc. (S2), and afterwards, the bidder automatically proposes evaluation indicators through the bidder's terminal to transmit the evaluation indicators to the server 2 (S3).

In this case, when the bidder's terminal 1 accesses the server 2 through the Internet, web browsers provided by the bidder's terminal 1 or exclusive apps (applications) installed on a mobile terminal may be used, and an access account provide to one bidder may be used to log in the server 2.

Exclusive programs for the bidder's terminal 1 are also used to access the server 2 and to propose evaluation indicators.

In an example, beside the way that the bidder proposes evaluation indicators through the bidder's terminal 1, a proposer proposing evaluation indicators may propose evaluation indicators through the bidder's terminal 1 or the proposer's separate terminal although the proposer will not actually bid for a project. In describing the present invention, for convenience's sake, the way that a proposer or a bidder proposes evaluation indicators by using the bidder's terminal 1 will be described as an example.

In step 3, the bidder may generate new evaluation indicators to transmit the new evaluation indicators to the server 2 or may group a plurality of evaluation indicators to transmit the grouped evaluation indicators to the server 2, or may select evaluation indicators or grouped evaluation indicators stored in a database 25 of the server 2 as performance evaluation items.

In addition, in step 3, in the case that grouped evaluation indicators uploaded to the server 2 by a specific bidder are used by another bidder, the server 2 distributes profits to the relevant bidder uploading the grouped evaluation indicators that was used, and stores the information that the grouped evaluation indicators are used in the database 25.

In this case, when the bidder's terminal 1 proposes evaluation indicators to upload the evaluation indicators to the server 2, or uses evaluation indicators or grouped evaluation indicators stored in the server 2, the bidder's terminal 1 inputs information on the evaluation indicators to upload the information to the server 2.

Accordingly, the server 2 classifies performance evaluation items selected by each bidder (S4) and groups bidders who selected identical or similar performance evaluation items (S5).

Then, the server 2 calculates evaluated scores of each participant researcher through multiple operations of project participation rates and performance share rates in performance information relevant to performance evaluation items within evaluation periods of a participant researcher put into a project (S6). In this case, weights may be applied to quantitatively express the performance evaluation items on the basis of each group.

Accordingly, the server adds up evaluated scores of participant researchers put into the relevant project (S7), converts the added-up evaluated scores to bid costs into evaluated price rates. The server selects a research and development project on the basis of the evaluated price rates according to ranks or selection rates (S8).

Then, hereunder, the processes of autonomously proposing and grouping performance evaluation items, allocating performance share rates in the performance evaluation items to the database, selecting project participation rates for a project, and bidding for and selecting a researcher and development project will be described in detail.

Autonomously Proposing and Grouping Performance Evaluation Items

The present invention relates to a system and a method for selecting a research and development project through autonomous proposals of evaluation indicators. Unlike conventional methods for selecting a research and development project in which bidders can have opportunities to bid for a project only in the case that they satisfy the relevant requirements for regulations preset by specific institutes, the present invention is capable of selecting a research and development project by setting performance evaluation items (criteria for selecting a research and development project) included in evaluation indicators autonomously proposed by bidders. In general, businesses, research institutes and universities participate in the bid for a research and development project. In the embodiments of the present invention, for convenience's sake, the case that a university participates in the bid for a project will be described as an example. Professors of universities usually participate in the bid for a project. That is, these professors together with participant researchers including master and doctors bid for a project.

As illustrated in FIG. 6, for instance, when selecting performance evaluation items for a certain period of evaluation, professor A may use a paper and employment of professor A's student as criteria for selecting a research and development project, considering that professor A is highly likely to obtain the highest evaluated scores in the case that professor A selects the paper of 100 points and the student employment of 40 points as evaluation indicators including performance evaluation items and weights. Further, professor A may bid by using similar performance evaluation items and weights and evaluation periods as criteria for selecting the research and development project. To be sure, another professor may bid for the project by setting different performance evaluation items and weights and evaluation periods.

That is, professor B may bid for the project by using the student employment of 100 points, the patent of 50 points, the paper of 50 points as performance indicators which serve as criteria for selecting the research and development project. Further, professor C may bid for the project by using the patent of 100 points, the student employment of 100 points as performance indicators which serve as criteria for selecting the research and development project. In addition, professor D may bid for the project by using the paper of 50 points, the patent application of 100 points as performance indicators which serve as criteria for selecting the research and development project. As described above, each of the professors autonomously selects and proposes evaluation indicators most advantageous to them as criteria for selecting a research and development project by evaluating the evaluation indicators on their own.

As described above, there are various evaluation indicators. Accordingly, the process of grouping the evaluation indicators is needed. That is, the process is carried out considering kinds of performance evaluation items and rates of which weights are applied. Accordingly, groups with identical evaluation indicators or groups within similar setting ranges are made. That is, group A may consist of bidders proposing student employment and papers as performance evaluation items, group B may consist of bidders proposing student employment as a performance evaluation item, group C may consist of bidders proposing paper publication as a performance evaluation item, and group D may consist of bidders proposing patent application as a performance evaluation item. Besides, various groups may be made according to combinations of various performance evaluation items, weights and evaluation periods. In addition, groups may be divided into sub groups according to the rates of which weights are applied.

The process of grouping the evaluation indicators may be omitted from the entire processes and may be managed through a simple list considering the evaluation indicators etc., and if necessary, evaluation indicators may be added by institutes supporting a project.

As described above, evaluation indicators are determined and derived for the relevant groups. In this process, evaluation indicators are determined through a face-to-face evaluation of evaluation indicators proposed by bidders, or may be added by institutes supporting a project. Further, fields of research and development such as mechanical engineering, production designs etc. are added as performance evaluation indicators, and papers relevant only to such fields are acknowledged as being performance such that bidders in the same fields may compete with each other. Further, details on execution of research expenses such as costs of manufacturing a trial product etc. are proposed as performance evaluation indicators and details on research expenses used in line with the purpose of a project are extracted to give weights e.g. one point per 100,000 won.

Then, hereunder, the process of grouping the evaluation indicators will be described in more detail.

A research and development project in which different professors give weights at different rates to evaluation indicators may be proposed. For instance, professor B proposes a research and development project in which the weight of 100 points is given to the indicator of employment, the weight of 50 points to the indicator of a patent, and the weight of 50 points to the indicator of a paper while professor C proposes a research and development project in which the weight of 100 points is given to the indicator of a patent, and the weight of 100 points to the indicator of employment, and professor D proposes a research and development project in which the weight of 50 points to the indicator of a paper, and the weight of 100 points to the indicator of a patent. Meanwhile, evaluation indicators of various research and development projects may be autonomously determined through the evaluation of the proposed evaluation indicators.

As described above, there are various evaluation indicators. Accordingly, the process of grouping the evaluation indicators is needed. Hererin, as an example of the present invention, the process is carried out considering rates of which weights are applied etc. As a method for grouping the evaluation indicators, weights are expressed as a percentage, and out of percentages of identical weights, small percentages are selected and multiplied to become integers. In the above-described case, professor B and professor C considered to have similar evaluation indicators are grouped.

The weights of 100 points to employment, 50 points to a paper and 50 points to a patent, which are given by professor B, are expressed respectively as 50% for employment, 25% for a paper and 25% for a patent. Further, the weights of 100 points to employment and 100 points to a patent, which are given by professor C, are expressed respectively as 50% for employment and 50% for a patent. When out of the percentages of each weight, small percentages in common evaluation indicators are selected, the percentage for employment is 50%, and the percentage for a patent is 25%. The evaluation indicators have the same effects in the case that the evaluation indicators have the same rates.

That is, although there are cases in which 200 points are given to the indicator of employment and 100 points to the indicator of a patent and in which 50 points are given to the indicator of employment and 25 points to the indicator of a patent, in both cases, the evaluation indicators have the same effects. As proper weights, 100 points are given to the indicator of employment and 50 points are given to the indicator of a patent.

There are various methods for grouping evaluation indicators besides the above-described methods.

As described above, when evaluation indicator groups that are different from each other are merged, in the case that different weights are given to identical performance evaluation items, small weights are expressed as percentages to merge two different indicator groups.

Conversely, bidders may divide evaluation indicator groups by extracting only specific performance evaluation items and the weights thereof from one evaluation indicator group and uses the weights expressed as percentages of the extracted performance evaluation items to generate a new evaluation indicator group. Accordingly, bidders are free to merge or divide evaluation indicator items to group the evaluation indicators.

In an example where evaluation indicators are divided or merged, when an evaluation indicator group in which the weight of 50 points is given to a patent, and the weight of 50 points is given to a paper is merged with an evaluation indicator group in which the weight of 100 points is given to a patent, and the weight of 100 points is given to employment, performance evaluation indicators are selected to become weights of multiples that are identical with each other to generate an evaluation indicator group in which the weight of 100 points is given to a patent, the weight of 100 points to a paper, and the weight of 100 points to employment. When the process is reversed, one evaluation indicator group may be divided into a plurality of different evaluation indicator groups.

Allocating Project Participation Rates in the Performance Evaluation Items to the Database The process of calculating evaluated scores on the basis of performance evaluation items to obtain evaluated price rates will be described.

Performance evaluation items have to be quantitatively evaluated on the basis of detailed evidential materials. If it turns out the materials are false or repeated, punishments such as the halt to provision for research expenses or reimbursement of research expenses, fines etc. should be granted.

Performance evaluation items include various elements such as paper publication, patent application, student employment etc., and in the embodiments of the present invention, for convenience's sake, the case in which papers and student employment are proposed as performance evaluation items will be described as an example.

First, in the case of a paper, the relevant paper may be co-authored, and accordingly, performance share rates in performance evaluation items are distributed to the lead author and co-authors. On the basis of the performance share rates, evaluated scores may be determined.

Meanwhile, in the case that there are a plurality of evaluation indicators relevant to one evaluated performance, preferably, all the evaluation indicators are stored such that evaluation indicators with the highest evaluated scores are automatically selected when evaluated scores are estimated. For instance, in the case that a English-language paper published domestically is evaluated performance, and the evaluated performance are relevant to two evaluation indicators of a paper registered on the SCI list and a paper registered domestically, the evaluation indicator of a paper registered on the SCI list with high evaluated scores may be selected when evaluated scores for the evaluated performance are estimated. But, in the case that both the evaluation indicators are used to estimate evaluated scores, preferably, punishments such as exclusion from a bid or a ban on participating in a later bid should be granted.

Herein, for convenience's sake, the total performance share rate of all the participants (author in the case of a paper) in one performance evaluation item is limited to 100% and the performance share rates (workloads) are assumed to be expressed as numbers.

In the case of a paper, performance share rates may be distributed to the lead author and co-authors. That is, as illustrated in FIG. 7, in the case that the weight of 100 points is given to paper P, and author A has a 10% performance share rate while author B has a 90% performance share rate (actual lead author), in terms of paper A, author A has the evaluated score of 10 points (100 points×10%=10 points) and author B has the evaluated score of 90 points (100 points×90%=90 points) respectively.

Meanwhile, student employment may act as another variable when evaluated scores are estimated.

Herein, preset evaluation indicators are also applied to student employment. For instance, in the case that a 100% performance share rate is given to author B on the basis of the weight of 40 points, author B has 40 points (40 points× 100%=40 points) as an evaluated score. Accordingly, author B has the total of 130 points as an evaluated score. That is, author B has the total of 130 points as an evaluated score on the basis of the performance evaluation indicators of paper publication and employment of author B's student.

Selecting project participation rates for a project Evaluated scores are computed for bidders and each participant researcher included in bidders with respect to actual performance and the evaluated scores are expressed as numbers.

First, the case in which evaluated scores are computed on the basis of papers published during evaluation periods proposed as performance evaluation items will be described. Evaluation periods mean a certain period of time available for quantitatively evaluating performance evaluation items in a fair way for fair evaluation before or after a bid, and performance only during evaluation periods is considered to be included in evaluation indicators. Fair evaluation is possible in the case that the period of time before a bid is proposed as an evaluation period. However, considering projects and evaluation indicators, the period of time of research and development or the period of time after a bid may be included, and accordingly, evaluation periods may be lengthened. In the case of old performance, the rate of the old performance as evaluation indicators may be lowered to be reflected in estimating evaluated scores.

TABLE 1

| Bidder group in evaluation indicator | Database of performance share rate | Database of project participation rates | Evaluated score for project |
|---|---|---|---|
| Performance evaluation item Weight of paper 100 Points (Acknowledged copyright) | Paper P Author A 10% Author B 90% | Researcher A Lecture 30% Faculty dean 30% Project X 30% Project Y 10% | Total score for project X 25 Points |
| Performance evaluation item Weight of employment 40 Points (Acknowledged copyright) | Employment Q Researcher C 100% | Researcher B Project X 20% Others 80% | Total score for project Y 13 Points |
| | | Researcher C Project X 10% Project Y 30% Others 60% | |

By referring to Table 1 illustrated above, the process of selecting project participation rates will be described.

In the case of author A, papers published only during evaluation periods may be acknowledged as being performance. In addition, herein, preferably, the rates of which one paper is used are proportionate to the project participation rates of a participant researcher of a research and development project (cf. In the past, a paper was used to bid for different research and development projects, and all of the authors A, B, and C were considered lead authors or had high project participation rates. That is, when evaluated scores were estimated, the total evaluated score of the authors was more than or equal to 100%, which means the paper was repeatedly used for different bid).

Each participant researcher (in the case of a paper, author) may be put into a variety of projects. That is, author A may participate in projects X, Y etc. and author B may participate in projects Y, Z etc.

Herein, for convenience's sake, the project participation rates of each author are limited to 100% and the project participation rates (workloads) are assumed to be expressed as numbers. In the case that the project is selected, the project participation rates of participant researchers including professor A for project X are fixed during evaluation periods, and then, the participant researchers including professor A may bid for project Y by using the rest project participation rates deducting the project participation rates for project X within the range of 100%.

Accordingly, as an example, author A, as illustrated in FIG. 8, may allocate a 30% project participation rate to project X and a 10% project participation rate to project Y.

There are cases where author A serves as at least one or more of a professor, a faculty dean, a head researcher and takes charge of a task. In this case, author A may not allocate all the project participation rates to projects X and Y. In the case that a professor as a head researcher or a participant researcher serves as a faculty dean or delivers a lecture, the professor may be forced to allocate a 30% project participation rate. That is, author A, as an example, may allocate a 30% project participation rate as a head researcher of project X, a 10% project participation rate as a participant researcher of project Y, a 30 project participation rate as a lecturer (3% per credit—i.e. 30%=3%×10 credits lecture) and a 30% project participation rate as a faculty dean. Accordingly, the total project participation rate of author A is 100%. Herein, a head researcher may ask for the project participation rate of more than or equal to 30%, and a participant may ask for the project participation rate of more than or equal to 10%.

Meanwhile, author A (professor) may record project participation rates of project X on a monthly bases during project evaluation periods (e.g. one year before a bid). For instance, the total project participation rate, project participation rates (theoretical project participation rates) of project X during evaluation periods may be calculated on average. For instance, if a bid for a project was made on Jan. 1, 2015, the evaluation period could last from Jan. 1, 2014 until Dec. 31, 2014. In the case that project participation rates were on a monthly basis recorded on the basis of the project participation rate from January to June of 50%, and the project participation rate from July to December of 10%, performance relevant to evaluation indicators during the evaluation periods may be applied respectively on a monthly basis in proportion to the project participation rates with respect to the monthly project participation rates. In an example, the average project participation rate may be converted to be respectively applied to evaluation periods. If professor A was selected in a bid by using a 30% project participation rate for project X, a 30% project participation rate for lectures and a 30% project participation rate as a faculty dean during the evaluation periods, author A may bid for another project with the project participation rate within 10%. Accordingly, the total project participation rate of author A does not exceed 100%.

Meanwhile, many authors including author B may also be given project participation rates with respect to projects on the basis of the roles of the authors including author B.

For instance, here we assume that author A serves as a professor, and author B and author C are students. Then, authors B and C may have a 20% project participation rate and a 10% project participation rate respectively for project X, and affect evaluated scores according to their employment which will be described hereunder.

Meanwhile, in project X, author A's 30% project participation rate, author B's 20% project participation rate, and author C's 10% project participation rate may be include to estimate the total input amount. Herein, the total input amount is defined as the total evaluated score of each participant researcher as described above.

In this case, if performance share rates may be distributed to papers. That is, if the evaluation indicator of paper A is 100 points, author A has a 10% performance share rate, author B has a 90% performance share rate, author A has 10 points as an evaluated score (100 points×10%=10 points) in relation to paper A. Accordingly, the evaluated score for project X calculated from author A's 30% project participation rate is three points (100 points (weight of paper)× 10% (performance share rate)×30% (project participation rate)=3 points).

Further, the evaluated score of author B is 18 points (100 points (weight)×90% (performance share rate)×20% (project participation rate)=18 points), and the evaluated score of author C is 0 point (100 points (weight)×0% (no performance share rate in paper A)$^x$ 10% (project participation rate)=0 point). Finally, the total evaluated score of participant researchers put into project X is 21 points.

Meanwhile, preset evaluation indicators are also applied to student employment. For instance, if on the basis of the weight of 40 points, author C is employed by a company in a local area (referred to as employment Q), is given a 100% performance share rate, and puts a 30% project participation rate in project Y, the evaluated score of author C is 12 points (40 points×100% (performance share rate)×30% (project participation rate).

Further, the evaluated scores of authors A and B are estimated. Finally, the evaluated scores put into project Y are calculated.

A bidder proposes a bid price on the basis of the total evaluated score. For instance, in the case that the total evaluated score is 36 points, a bidder may bid for a research and development project having the evaluation indicators of papers and student employment. To be sure, bid prices may be arbitrarily determined by bidders for research and development projects.

Meanwhile, the database may be continually updated on the basis of such evaluation indicators, performance share rates, project participation rates.

Until now, databases in relation to performance have been created. On top of performance, performance share rates and project participation rates are added to prevent the repetitive used of performance and to prevent simultaneous evaluation in various projects. Further, in the conventional top-down approach, the government takes advice from experts to create evaluation indicators. According to the present invention, together with a database of performance, a database of practical quantitative evaluation indicators which are updated on a yearly basis may be created through autonomous proposals of participant researchers who are actually subject to evaluation in the bottom-up approach. In addition, the present invention may be applied to conventional methods for evaluation.

By doing so, participant researchers will think carefully about what is proposed as evaluation indicators and propose essential evaluation indicators such that the participant researchers may be successful in the bid for a research and development project. This is an indispensible factor for fair evaluation. In large-scale projects important to a nation, the government may propose evaluation indicators in the top-down approach by selecting some of the proposed evaluation indicators.

Meanwhile, in relation to evaluation indicators which are stored and accumulated in the system (database) of the present invention, an institute managing the system and individuals proposing the evaluation indicators, preferably, have the copyright on the evaluation indicators to receive the copyright royalties from the government or institutes using the stored evaluation indicators.

Meanwhile, evaluation periods available for evaluating performance included in evaluation indicators means periods available for quantitatively evaluating performance evaluation items and should be distinguished from the period in which project participation rates of participants may be given. However, in the embodiments of the present invention, for convenience's sake, the case that the evaluation periods and the period in which project participation rates of participants may be given are used together will be described.

For instance, if the evaluation period, in which project participation rates relevant to a paper which will be published in May are computed, lasts from July to August of the same year, the evaluation period is not overlapped with the time for publishing the paper. Accordingly, it should be determined whether to exclude the paper from the calculation of evaluated scores or to divide the period in which project participation rates are calculated and the evaluation period in which performance evaluation items are acknowledged.

In the period in which project participation rates are calculated, if a bid will be made in July, project participation rates may be quantitatively determined before the bid. However, participation rates as a faculty dean etc. in August may not be calculated because August is not yet to come. Then, preferably, the project participation rates are adjusted to prevent participation in another bid. That is, if a participant researcher served as a faculty dean in June, the participant researcher had a 30% project participation rate as a faculty dean, a 30% project participation rate for project X and a 30% project participation rate for project Y, while in August, the participant researcher might not serve as a faculty dean and might have a 80% project participation rate for project X and a 30% project participation rate for project Y. Accordingly, only simultaneous bids for project A and B may be prevented. Provided that after project X is selected, the participant researcher serves as a faculty dean, the participant researcher has a 80% project participation rate for project X and a 30% project participation rate as a faculty dean and the total project participation rate exceeds 100%, the participant researcher may not bid for later projects and may be granted punishments such as the reimbursement of research expenses. Accordingly, at the time of a bid for a project, participation rates of the future should be carefully determined.

Meanwhile, without storing information on the project participation rates of researcher A in project X, evaluated scores may be estimated on the basis of project participation rates for project X stored in the database of researcher A. As described above, project participation rates should be stored only in a database with the total project participation rate of less than 100% such that the database may be easily managed. In projects, it doesn't matter that the total project participation rate of participant researchers exceeds 100% The higher the project participation rates become, the higher evaluated scores become. However, the total participation rate of a participant researcher in the items of participated projects and faculty deans etc. may not exceed 100%. Further, the head researcher of project X may select other evaluation indicator groups or autonomously propose new evaluation indicators by searching the database from researcher A's performance share rates stored in the database of paper P and project participation rates for project X stored in researcher A's database and monitoring all the performance information relevant to 100 points for a paper and 40 points for employment as evaluation indicator groups for project X.

Bidding for and Selecting a Researcher and Development Project

Considering these evaluated scores, professors of each university select research and development groups and make a bid. That is, each of the professors makes a bid considering the performance evaluation items and conditions (evaluated score etc.), corresponding to evaluation indicators, of participant researchers including master and doctors. To be sure, in this case, the professors may propose evaluation indicators and group the evaluation indicators among bidders considering the evaluated scores of the participant researchers at the same as the professors make a bid.

The head researcher, at the time of bidding, may select performance evaluation items necessary for bidding out of all the generated performance evaluation items of the participant researchers to calculate evaluated scores. To be sure, if these performance evaluation items are excluded in the bid, the performance evaluation items may be used in another bid.

Finally, for instance, if a bid is made on the basis of 100 points of a paper and 40 points of student employment as criteria for selecting a research and development project, the performance of author A's paper is calculated as 100 points (weight of paper)×10% (author A's performance share rate)×30% (author A's project participation rate for project X)=3 points.

The Performance of author B and author C participating in project X is calculated to calculate the total performance. That is, a bid is made through budget rates with respect to the total performance. In the case of project X, all the relevant performance of the participant researchers are added up for evaluation during evaluation periods. The system automatically finds a group with evaluation indicators in which the highest evaluated scores are calculated by adding up the evaluated scores of all the participant researchers or expressing details of research expenses in ordinary years (e.g. average and standard deviation) and current bid conditions such that a bidder may select a group available for a bid.

Herein, the budget for supporting the relevant group may be preset or may be set in real time according to the result of the grouping. That is, each professor predicts amounts of the budget for supporting each group and levels of competition to make a bid or makes a bid while checking amounts of the budget for supporting each group and levels of competition in real time.

If a bidder fails in the bid, the bidder may be selected next year by adjusting bid prices on the basis of the performance.

Meanwhile, in the case that budget rates with respect to the total performance of participants put into project Y are high, the participants are less likely to be selected in next year's bid because the performance of the participants are considered to be low, However, the participants may raise the possibility that they will be selected next year adjusting bid prices.

As describe above, at the time of bidding, bid prices are determined on the basis of evaluated scores. For instance, if 100 million won is allocated to groups A, professors at universities A, B, C and D may respectively propose a bid price of 30 million won, a bid price of 50 million won, a bid price of 30 million won and a bid price of 20 million won considering their evaluated scores. The system may suggest proper bid prices on the basis of bid prices of ordinary years and current circumstances.

Herein, research and development projects are evaluated and selected because 100 million won is allocated to groups A.

In this case, research and development projects may be selected in order from the lowest to the highest bid prices, according to the ratio of evaluated scores to bid prices or through other various methods. In this case, the server may transmit to the bidder's terminal information on commissions for a certain ratio of the total research expenses of the selected research and development project.

Meanwhile, in the embodiments of the present invention, the case that the ratios of evaluated scores to bid prices (evaluated price rate, unit of won/point) are determined will be described.

For instance, if professors A, B, C and D propose evaluated price rates of the total participant researchers of 50,000 won/point, 60,000 won/point, 70,000 won/point, 90,000 won/point respectively, professors A, B, C and D are arranged in order from the lowest to the highest evaluated price rates.

Afterwards, on the basis of the allocated amount with respect to the 100-million-won budget and bid prices, the number of teams proposing the lowest bid prices in order from the lowest to the highest bid prices is determined. That is, the total bid prices of the teams proposing the lowest bid prices should be within the range of 100 million won. Accordingly, professor proposing 30 million won and professor B proposing 50 million won are selected in the bid.

In this case, through determination of bid prices, the relevant ratios may be given on the basis of evaluated price rates. Further, the lowest and the highest prices may be determined and variably allocated according to the total bid prices although budgets for groups are not pre-determined and allocated. For instance, on condition that budgets for groups are allocated at prices between the lowest 30% and the highest 70%, if the total bid price is 100 million won, the average of 50 million won is allocated such that the competition rate of 2 to 1 may be maintained.

As described above, conventional methods for evaluating research and development projects consist of selection evaluation and outcome evaluation. If a bidder proposes goals set too high and then is selected for a project in selection evaluation, the goals should be re-evaluated in outcome evaluation in a fair way. However, in many cases, such re-evaluation has not been done in a fair way. That is, there is no way to protect project proposers who are not selected for a project even with achievable goals in selection evaluation.

However, the present invention is capable of carrying our selection evaluation and outcome evaluation at the same time thereby ensuring efficient and fair evaluation. In addition, the present invention is much more efficient and fair than conventional evaluation methods in that projects which have not yet carried out are selected and evaluated on the basis of performance of the past, and the results of outcome evaluation of the current project will be reflected in selection evaluation of the next project without performing separate outcome evaluation.

Meanwhile, in the case of evaluation indicators or evaluation indicator groups which are autonomously proposed, are unique or essential and important, have objective newness, which receive high scores in surveys with bidders, and which deserve copyright protection in various processes such as evaluation processes etc., institutes managing the system with respect to such evaluation indicators or evaluation indicator groups and individuals proposing such evaluation indicators or evaluation indicator groups, preferably, have the copyright on the evaluation indicators or evaluation indicator groups to receive the copyright royalties from the government or institutes using the stored evaluation indicators.

The present invention has been described in detail with reference to the embodiments. The inventive subject matter, however, may be embodied in various different forms without departing from the spirit and scope of the present invention and should not be construed as being limited only to the illustrated embodiments.

DESCRIPTION OF SYMBOLS

1: Bidder's terminal 2: Sever
21: Performance evaluation item classification unit 22: Bidder grouping unit
23: Performance computation unit 231: Evaluated score calculation unit
232: Evaluated price rate conversion unit 233: Weight applying unit
24: Research and development project selection unit 25: Database

The invention claimed is:

1. A system for selecting a research and development project through autonomous proposals of evaluation indicators comprising:
   a bidder's terminal for proposing performance evaluation items, which serve as criteria for selecting a research and development project, as evaluation indicators and for generating performance information on the evaluation indicators; and
   a server for storing the evaluation indicators and the performance information thereon uploaded by the bidder's terminal and for selecting a bidder who will carry out the research and development project by carrying out performance evaluation computation, wherein:
   the server groups a plurality of the evaluation indicators proposed by the bidder's terminal to generate evaluation indicator groups, the server comprising:
      a performance evaluation item classification unit for classifying at least one performance evaluation item the evaluation indicators comprise into evaluation indicator groups;
      a bidder grouping unit for allowing bidders to be included in the classified performance indicator groups so as to group the bidders;
      a performance computation unit for computing performance according to the performance evaluation items on the basis of each group; and
      a research and development project selection unit for selecting a research and development project according to preset regulations on the basis of each group, wherein:
      the research and development project selection unit calculates evaluated scores of a participant researcher put into a project, adds up evaluated scores of researchers put into the project, converts the added-up evaluated scores to bid costs into evaluated price rates, and on the basis of the evaluated price rates, selects a research and development project.

2. A system for selecting a research and development project through autonomous proposals of evaluation indicators according to claim 1,
   wherein the bidder's terminal proposes at least one of papers, patents, employment, details on execution of research expenses and the total amount thereof, technology transfer as the performance evaluation items.

3. A system for selecting a research and development project through autonomous proposals of evaluation indicators according to claim 1,
   wherein the bidder's terminal accesses the server through the Internet, and accesses the server through web browsers or exclusive applications.

4. A system for selecting a research and development project through autonomous proposals of evaluation indicators according to claim 1,
   wherein the bidder's terminal is construed as a plurality of bidders' terminals, and the evaluation indicators proposed by the plurality of bidders' terminals are uploaded to the server.

5. A system for selecting a research and development project through autonomous proposals of evaluation indicators according to claim 1,
   wherein the server stores the evaluation indicators, generated and delivered by the bidder's terminal, in a database, and the database is updated each time new evaluation indicators are proposed on the bidder's terminal.

6. A system for selecting a research and development project through autonomous proposals of evaluation indicators according to claim 1,
   wherein the performance evaluation item classification unit updates the evaluation indicators by analyzing the evaluation indicators.

7. A system for selecting a research and development project through autonomous proposals of evaluation indicators according to claim 1,
   wherein the performance evaluation item classification unit analyzes evaluation indicator groups which are different from each other to integrate the evaluation indicator groups which are different from each other into one evaluation indicator group, and resets weights of the integrated evaluation indicator group.

8. A system for selecting a research and development project through autonomous proposals of evaluation indicators according to claim 1,
   wherein the performance evaluation item classification unit analyzes evaluation indicator groups which are different from each other to integrate the evaluation indicator groups which are different from each other into one evaluation indicator group, and resets evaluation periods of the integrated evaluation indicator group.

9. A system for selecting a research and development project through autonomous proposals of evaluation indicators according to claim 1,
   wherein the performance evaluation item classification unit analyzes an evaluation indicator group to divide the evaluation indicator group into two different evaluation indicator groups.

10. A system for selecting a research and development project through autonomous proposals of evaluation indicators according to claim 1,
    wherein the server allows the performance information on the evaluation indicators generated by the bidder's terminal to correspond with a plurality of evaluation indicator groups so as to carry out performance evaluation computation, and provides to the bidder's terminal computation results of specific evaluation indicator groups with the best performance evaluation computation results.

11. A system for selecting a research and development project through autonomous proposals of evaluation indicators according to claim 1,
    the performance computation unit comprising:
       an evaluated score calculation unit for calculating evaluated scores of a participant researcher put into a project; and
       an evaluated price rate conversion unit for adding up evaluated scores of participant researchers put into the project and for converting the added-up evaluated scores to bid costs into evaluated price rates.

12. A system for selecting a research and development project through autonomous proposals of evaluation indicators according to claim 11,
    wherein the evaluated score calculation unit calculates evaluated scores of each participant researcher by using project participation rates of the participant researchers put into the project.

13. A system for selecting a research and development project through autonomous proposals of evaluation indicators according to claim 11,
    wherein the evaluated score calculation unit calculates the evaluated scores of each participant researcher through multiple operations of project participation rates and performance share rates in the performance evaluation items of the participant researchers put into the project.

14. A system for selecting a research and development project through autonomous proposals of evaluation indicators according to claim 1,
wherein the bidder's terminal proposes weights of the evaluation indicators proposed by the bidder's terminal and also, uploads the weights of the evaluation indicators to the server.

15. A system for selecting a research and development project through autonomous proposals of evaluation indicators according to claim 1,
wherein the bidder's terminal proposes evaluation periods of the evaluation indicators proposed by the bidder's terminal and also, uploads the evaluation periods of the evaluation indicators to the server.

16. A system for selecting a research and development project through autonomous proposals of evaluation indicators according to claim 1,
wherein the research and development project selection unit calculates computation results of the performance computation unit as evaluated scores, and compares the calculated evaluated scores respectively with bid prices of ordinary years and with bid prices of the bidder's terminal to calculate, according to the calculated evaluated scores, probability of success in a bid of the bidder's terminal and to inform the bidder's terminal of the probability.

17. A system for selecting a research and development project through autonomous proposals of evaluation indicators according to claim 1,
wherein the research and development project selection unit calculates computation results of the performance computation unit as evaluated scores, and compares the calculated evaluated scores respectively with bid prices of ordinary years and with bid prices of the bidder's terminal to calculate, according to the calculated evaluated scores, bid prices available for success in a bid of the bidder's terminal and to inform the bidder's terminal of the bid prices.

18. A system for selecting a research and development project through autonomous proposals of evaluation indicators according to claim 1,
wherein the research and development project selection unit calculates computation results of the performance computation unit, with respect to a plurality of evaluation indicator groups, as evaluated scores, and compares the plurality of calculated evaluated scores respectively with bid prices of ordinary years and with bid prices of the bidder's terminal to calculate, according to the plurality of calculated evaluated scores, probability of success in a bid of the bidder's terminal and to inform the bidder's terminal of the probability.

19. A system for selecting a research and development project through autonomous proposals of evaluation indicators according to claim 11,
wherein the performance computation unit calculates the computation results of the performance computation unit, with respect to a plurality of evaluation indicator groups, as evaluated scores, and informs the bidder's terminal of the evaluation indicators in which the highest evaluated scores are calculated.

20. A system for selecting a research and development project through autonomous proposals of evaluation indicators according to claim 11,
wherein performance share rates are given with the consent of participant researchers and stored in the server.

21. A system for selecting a research and development project through autonomous proposals of evaluation indicators according to claim 11,
wherein total performance share rates in one piece of performance information are less than or equal to 100%, and when a bid for a research and development project is successful, the performance share rates are fixed and stored in the server.

22. A system for selecting a research and development project through autonomous proposals of evaluation indicators according to claim 12,
wherein the project participation rates are managed according to each participant researcher on the basis of any one of the units of year, month, week, day, and stored in the server.

23. A system for selecting a research and development project through autonomous proposals of evaluation indicators according to claim 12,
wherein the performance computation unit informs the bidder's terminal of ratios of the optimum project participation rates of which the highest evaluated scores are calculated according to changes in ratios of each project participation rate of the participant researcher with respect to various projects.

24. A system for selecting a research and development project through autonomous proposals of evaluation indicators according to claim 12,
wherein the performance computation unit informs the bidder's terminal of ratios of a plurality of project participation rates, of which identical evaluated scores are calculated, of the participant researcher with respect to various projects.

25. A system for selecting a research and development project through autonomous proposals of evaluation indicators according to claim 12,
wherein total project participation rates of one participant researcher are less than or equal to 100%, and when a bid for a research and development project is successful, the project participation rates of the relevant project are fixed and stored in the server.

26. A system for selecting a research and development project through autonomous proposals of evaluation indicators according to claim 1,
wherein when a bidder who will carry out the research and development project is selected, the server pays commissions to the bidder's terminal proposing the evaluation indicators used for selecting the bidder, and
wherein the commission is paid in a certain amount of the total research expenses of the research and development project.

27. A system for selecting a research and development project through autonomous proposals of evaluation indicators according to claim 1,
wherein the server pays commissions as copyright royalties to the bidder's terminal proposing the used evaluation indicators, when the evaluation indicators proposed by the bidder's terminal are used.

28. A system for selecting a research and development project through autonomous proposals of evaluation indicators according to claim 1,
wherein the server stores feedback on the used evaluation indicators, and the bidder's terminal updates evaluation indicators on the basis of the feedback.

29. A method for selecting a research and development project through autonomous proposals of evaluation indicators comprising:

a step in which a bidder's terminal autonomously proposes evaluation indicators as performance evaluation items to transmit the evaluation indicators to a server or selects evaluation indicators stored in a server; and a step in which the server classifies the evaluation indicators selected by each bidder's terminal, groups bidders selecting identical or similar evaluation indicators, and selects a research and development project by computing performance according to the performance evaluation items on the basis of each group, further comprising:

calculating evaluated scores of each participant researcher put into a project;

adding evaluated scores of participant researchers put into the relevant project to the calculated evaluated scores; and converting the added-up evaluated scores to bid costs into evaluated price rates to select a research and development project on the basis of the converted evaluated price rates according to ranks or selection rates.

30. A method for selecting a research and development project through autonomous proposals of evaluation indicators according to claim 29, wherein the performance evaluation items in the evaluation indicators comprise any one of papers, patens, employment, details on execution of research expenses and the total amount thereof, technology transfer.

31. A method for selecting a research and development project through autonomous proposals of evaluation indicators according to claim 29, wherein while the bidder's terminal accesses the server through the Internet, the bidder's terminal accesses the server through web browsers or exclusive applications.

32. A method for selecting a research and development project through autonomous proposals of evaluation indicators according to claim 29, the method further comprising:

a step in in which a plurality of bidders' terminals access the server through access accounts before the step in which a bidder's terminal autonomously proposes evaluation indicators as performance evaluation items to transmit the evaluation indicators to a server or selects evaluation indicators stored in a server.

33. A method for selecting a research and development project through autonomous proposals of evaluation indicators according to claim 29, the step in which the server calculates evaluated scores of each participant researcher put into a project comprising:

calculating evaluated scores of each participant researcher on the basis of project participation rates of participant researchers put into a project.

34. A method for selecting a research and development project through autonomous proposals of evaluation indicators according to claim 29, the step in which the server calculates evaluated scores of each participant researcher put into a project comprising:

calculating evaluated scores of each participant researcher through multiple operations of project participation rates of participant researchers put into a project and performance share rates in the performance evaluation items.

35. A method for selecting a research and development project through autonomous proposals of evaluation indicators according to claim 29, wherein the bidder's terminal groups a plurality of evaluation indicators to transmit the grouped evaluation indicators to the server or selects the grouped evaluation indicators stored in the server, in the step in which a bidder's terminal autonomously proposes evaluation indicators as performance evaluation items to transmit the evaluation indicators to a server or selects evaluation indicators stored in a server.

36. A method for selecting a research and development project through autonomous proposals of evaluation indicators according to claim 29, wherein a bidder grouping unit allows the bidder's terminal to be included in grouped evaluation indicators in the step in which the server classifies the evaluation indicators selected by each bidder's terminal, groups bidders selecting identical or similar evaluation indicators, and selects a research and development project by computing performance according to the performance evaluation items on the basis of each group.

37. A method for selecting a research and development project through autonomous proposals of evaluation indicators according to claim 29, the method further comprising:

a step in which when the bidder's terminal transmits grouped evaluation indicators to the server, the server updates a database storing the grouped evaluation indicators after the step in which the server classifies the evaluation indicators selected by each bidder's terminal, groups bidders selecting identical or similar evaluation indicators, and selects a research and development project by computing performance according to the performance evaluation items on the basis of each group.

38. A method for selecting a research and development project through autonomous proposals of evaluation indicators according to claim 29, the step in which the server classifies the evaluation indicators selected by each bidder's terminal, groups bidders selecting identical or similar evaluation indicators, and selects a research and development project by computing performance according to the performance evaluation items on the basis of each group comprising:

analyzing evaluation indicators that are different from each other by the server.

39. A method for selecting a research and development project through autonomous proposals of evaluation indicators according to claim 29, the step in which the server classifies the evaluation indicators selected by each bidder's terminal, groups bidders selecting identical or similar evaluation indicators, and selects a research and development project by computing performance according to the performance evaluation items on the basis of each group comprising:

analyzing evaluation indicators that are different from each other to integrate the evaluation indicators that are different from each other into one evaluation indicator, and resetting weights of the integrated evaluation indicator group by the server.

40. A method for selecting a research and development project through autonomous proposals of evaluation indicators according to claim 29, the step in which the server classifies the evaluation indicators selected by each bidder's terminal, groups bidders selecting identical or similar evaluation indicators, and selects a research and development project by computing performance according to the performance evaluation items on the basis of each group comprising:

analyzing evaluation indicators that are different from each other to integrate the evaluation indicators that are different from each other into one evaluation indicator, and resetting evaluation periods of the integrated evaluation indicator group by the server.

41. A method for selecting a research and development project through autonomous proposals of evaluation indicators according to claim 29, wherein the server analyzes evaluation indicators that are different from each other to divide one evaluation indicator into evaluation indicators that are different from each other, in the step in which the server classifies the evaluation indicators selected by each bidder's terminal, groups bidders selecting identical or similar evaluation indicators, and selects a research and development project by computing performance according to the performance evaluation items on the basis of each group.

42. A method for selecting a research and development project through autonomous proposals of evaluation indicators according to claim 29, the step of converting the added-up evaluated scores to bid costs into evaluated price rates to select a research and development project on the basis of the converted evaluated price rates according to ranks or selection rates comprising:

allowing performance information on the evaluation indicators generated by the bidder's terminal to correspond with a plurality of evaluation indicator groups to carry out performance evaluation computation, and providing to the bidder's terminal computation results of specific evaluation indicator groups with the best performance evaluation computation results by the server.

43. A method for selecting a research and development project through autonomous proposals of evaluation indicators according to claim 29, wherein the bidder's terminal proposes weights of the evaluation indicators proposed by the bidder's terminal and also, uploads the weights of the evaluation indicators to the server.

44. A method for selecting a research and development project through autonomous proposals of evaluation indicators according to claim 29, wherein the bidder's terminal proposes evaluation periods of the evaluation indicators proposed by the bidder's terminal and also, uploads the evaluation periods of the evaluation indicators to the server.

45. A method for selecting a research and development project through autonomous proposals of evaluation indicators according to claim 29, wherein the server calculates performance computation results as evaluated scores, and compares the calculated evaluated scores respectively with bid prices of ordinary years and with bid prices of the bidder's terminal to calculate, according to the calculated evaluated scores, probability of success in a bid of the bidder's terminal and to inform the bidder's terminal of the probability in selecting a research and development project by computing performance according to the performance evaluation items on the basis of each group.

46. A method for selecting a research and development project through autonomous proposals of evaluation indicators according to claim 29, wherein the server calculates performance computation results as evaluated scores, and compares the calculated evaluated scores respectively with bid prices of ordinary years and with bid prices of the bidder's terminal to calculate, according to the calculated evaluated scores, bid prices available for success in a bid of the bidder's terminal and to inform the bidder's terminal of the bid prices in selecting a research and development project by computing performance according to the performance evaluation items on the basis of each group.

47. A method for selecting a research and development project through autonomous proposals of evaluation indicators according to claim 29, wherein the server calculates performance computation results, with respect to a plurality of evaluation indicator groups, as evaluated scores, and compares the plurality of calculated evaluated scores respectively with bid prices of ordinary years and with bid prices of the bidder's terminal to calculate, according to the plurality of evaluated scores, bid prices available for success in a bid of the bidder's terminal and to inform the bidder's terminal of the bid prices in selecting a research and development project by computing performance according to the performance evaluation items on the basis of each group.

48. A method for selecting a research and development project through autonomous proposals of evaluation indicators according to claim 29, wherein the server adds up evaluated scores of researchers to calculate the total scores, and informs the bidder's terminal of the optimum evaluation indicator groups according to evaluated scores, average and current bid prices, and evaluation indicator groups.

49. A method for selecting a research and development project through autonomous proposals of evaluation indicators according to claim 29, wherein performance share rates are given with the consent of participant researchers and stored in the server.

50. A method for selecting a research and development project through autonomous proposals of evaluation indicators according to claim 29, wherein total performance share rates in one piece of performance information are less than or equal to 100%, and when a bid for a research and development project is successful, the performance share rates are fixed and stored in the server.

51. A method for selecting a research and development project through autonomous proposals of evaluation indicators according to claim 33, wherein the project participation rates are managed according to each participant researcher on the basis of any one of the units of year, month, week, day, and are stored in the server.

52. A method for selecting a research and development project through autonomous proposals of evaluation indicators according to claim 33, wherein the server calculates evaluated scores by putting together the project participation rates regarding all the projects the participant researcher participated in with respect to the project participation rates of the participant researcher.

53. A method for selecting a research and development project through autonomous proposals of evaluation indicators according to claim 33, the method further comprising:
a step in which the server transmits to the bidder's terminal ratios of the project participation rates of which the highest evaluated scores are computed according to changes in the project participation rates of the participant researcher.

54. A method for selecting a research and development project through autonomous proposals of evaluation indicators according to claim 33, the method further comprising:
a step in which the server transmits to the bidder's terminal ratios of a plurality of project participation rates, in which identical evaluated scores are calculated, of the participant researcher.

55. A method for selecting a research and development project through autonomous proposals of evaluation indicators according to claim 33, wherein total project participation rates of one participant researcher are less than or equal to 100%, and when a bid for the research and development project is successful, the project participation rates are fixed and stored in the server.

56. A method for selecting a research and development project through autonomous proposals of evaluation indicators according to claim 29, the step of selecting a research and development project comprising:
calculating evaluated scores of a researcher put into a project, adding up evaluated scores of researchers put into the project, converting the added-up evaluated scores to bid costs into evaluated price rates, and selecting a research and development project on the basis of the evaluated price rates.

57. A method for selecting a research and development project through autonomous proposals of evaluation indicators according to claim 29, the method further comprising:
a step in which the server transmits to the bidder's terminal information on commissions for a certain ratio of the total research expenses of the selected research and development project.

58. A method for selecting a research and development project through autonomous proposals of evaluation indicators according to claim 29, the method further comprising:
a step in which the server transmits to the bidder's terminal information on commissions for a copyright in the evaluation indicators used in the selected research and development project and pays copyright royalties to a proposer of the evaluation indicators.

59. A method for selecting a research and development project through autonomous proposals of evaluation indicators according to claim 29, the method further comprising:
a step in which the server stores feedback on evaluation indicators, and the bidder's terminal updates the evaluation indicators on the basis of the feedback.

* * * * *